(12) United States Patent
Lu

(10) Patent No.: US 7,386,870 B2
(45) Date of Patent: Jun. 10, 2008

(54) BROADCAST VIDEO CHANNEL SURFING SYSTEM BASED ON INTERNET STREAMING OF CAPTURED LIVE BROADCAST CHANNELS

(75) Inventor: Jin Lu, Croton On Hudson, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1064 days.

(21) Appl. No.: 09/935,885

(22) Filed: Aug. 23, 2001

(65) Prior Publication Data
US 2003/0041334 A1    Feb. 27, 2003

(51) Int. Cl.
*H04N 7/16* (2006.01)
*H04N 7/173* (2006.01)
*H04N 5/445* (2006.01)
*G06F 3/00* (2006.01)
*G06F 13/00* (2006.01)

(52) U.S. Cl. .............................. 725/62; 725/38; 725/86
(58) Field of Classification Search .................. 725/62, 725/86, 38
See application file for complete search history.

(56) References Cited

U.S. PATENT DOCUMENTS

| | | | |
|---|---|---|---|
| 5,768,535 A | 6/1998 | Chaddha et al. | 395/200.77 |
| 6,281,940 B1 * | 8/2001 | Sciammarella | 348/564 |
| 6,295,092 B1 * | 9/2001 | Hullinger et al. | 348/468 |
| 6,470,378 B1 * | 10/2002 | Tracton et al. | 709/203 |
| 6,536,043 B1 * | 3/2003 | Guedalia | 725/90 |
| 6,751,221 B1 * | 6/2004 | Saito et al. | 370/392 |
| 6,788,740 B1 * | 9/2004 | van der Schaar et al. | 375/240 |
| 6,804,827 B1 * | 10/2004 | Furukawa et al. | 725/140 |
| 6,930,984 B1 * | 8/2005 | Nomura et al. | 370/254 |
| 6,986,158 B1 * | 1/2006 | Terui et al. | 725/116 |
| 7,051,357 B2 * | 5/2006 | Carr | 725/110 |

FOREIGN PATENT DOCUMENTS

WO    WO0131497    3/2001

OTHER PUBLICATIONS http://www.monitor.ca/monitor/issues/vol2iss9/newstuff.html, Apr. 6, 1995.*
http://web.archive.org/web/19990508141539/http://www.apple.com/quicktime/showcase/live/ , May 5, 1999.*
Luis Martinez, "Remote Control with Preview Display", Sony Technical Digest, vol. 3, Nov. 2000, ISSN 1521-5180.

* cited by examiner

*Primary Examiner*—Hunter B. Lonsberry

(57) ABSTRACT

A method for reviewing broadcast channels. The method including: capturing at least one broadcast channel at a first site at a reduced quality from its broadcast quality; receiving the at least one reduced quality broadcast channel at a second site, the second site being remote from the first site; and reviewing the at least one reduced quality broadcast channel at the second site. Preferably, the reduced quality broadcast channel is captured on a video server corresponding to an Internet address and is downloaded from the Internet via a wireless transmission to a cellular phone, PDA, or the like.

23 Claims, 3 Drawing Sheets

BROADCAST VIDEO CHANNEL SURFING SYSTEM BASED ON INTERNET STREAMING OF CAPTURED LIVE BROADCAST CHANNELS

BACKGROUND OF THE INVENTION

1. Field of the Invention

The present invention relates generally to apparatus and methods for reviewing broadcast channels, and more particularly, to apparatus and methods for reviewing broadcast channels that are captured on a video server at a reduced quality and received at an apparatus to review, where the apparatus is preferably a wireless communication device.

2. Prior Art

It is known in the art to use a "picture-in-picture" (PIP) feature in televisions to give a viewer the capability of viewing a broadcast channel while reviewing another broadcast channel. Typically, televisions having a PIP feature require two tuners, one tuner to display the main broadcast channel being viewed and a second tuner for displaying another broadcast channel to be reviewed. Generally, the display from the second tuner is displayed in a small portion of the television screen.

A significant drawback of PIP is that it disturbs the viewer of the main channel and requires a second tuner in the television to browse other channels while a channel is being viewed. In addition, PIP does not support channel browsing outside a home.

SUMMARY OF THE INVENTION

Therefore, there is a need in the art for viewing (alternatively referred to herein as "surfing" or "browsing") broadcast channels at a reduced quality, such as at a slow frame rate and/or resolution. This need has particular importance in the following scenarios:

(1) while a first person or group of people are watching a broadcast television channel, a second person can browse other channels with a handheld device (so that he or she does not disturb first person or group of people); and (2) while a user is outside his or her home, he or she can check television channels or other broadcast channels on a PDA or cellular telephone through a wireless connection.

Therefore it is an object of the present invention to provide a method for browsing broadcast channels while another main channel is being viewed, which does not require another tuner for the channels being browsed.

It is another object of the present invention to provide a method for browsing broadcast channels while another main channel is being viewed, which does not disturb the viewer of the main channel.

It is still a further object of the present invention to provide a method for browsing broadcast channels while another main channel is being viewed, which can be done remotely.

Accordingly, a method for reviewing broadcast channels is provided. The method comprising: capturing at least one broadcast channel at a first site at a reduced quality from its broadcast quality; receiving the at least one reduced quality broadcast channel at a second site, the second site being remote from the first site; and reviewing the at least one reduced quality broadcast channel at the second site.

Preferably, the capturing step comprises capturing the at least one reduced quality broadcast channel on at least one video server corresponding to at least one Internet address and the receiving step comprises accessing the at least one Internet address and downloading the at least one reduced quality broadcast channel therefrom.

The at least one reduced quality broadcast channel preferably comprises a plurality of reduced quality broadcast channels, wherein the receiving step preferably comprises multicasting the plurality of reduced quality broadcast channels from the at least one Internet address. Alternatively, the receiving step comprises receiving a wireless transmission of the at least one reduced quality broadcast channel at the second site.

The at least one broadcast channel is preferably a broadcast television channel and the reduced quality is a lower speed and/or a lower resolution.

Also provided is a system for reviewing broadcast channels. The system comprising: capturing means for capturing at least one broadcast channel at a first site at a reduced quality from its broadcast quality; receiving means for receiving the at least one reduced quality broadcast channel at a second site, the second site being remote from the first site; and reviewing means for reviewing the at least one reduced quality broadcast channel at the second site.

The capturing means preferably comprises a video server corresponding to at least one Internet address and the receiving means preferably comprises accessing means for accessing the at least one Internet address and downloading means for downloading the at least one reduced quality broadcast channel therefrom. The Internet is preferably accessed via a wireless transmission.

Still yet provided is an apparatus for reviewing broadcast channels. The apparatus comprising: receiving means for receiving at least one broadcast channel at a reduced quality from its broadcast quality which has been previously captured at a remote site; and reviewing means for reviewing the at least one reduced quality broadcast channel.

The receiving means preferably comprises accessing means for accessing the at least one Internet address and downloading means for downloading the at least one reduced quality broadcast channel therefrom. The Internet is preferably accessed via a wireless transmission of the at least one reduced quality broadcast channel at the second site. The reviewing means is preferably a display integral with the apparatus for displaying a reduced quality broadcast television channel.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

Although this invention is applicable to numerous and various types of broadcast channels, it has been found particularly useful in the environment of broadcast television channels. Therefore, without limiting the applicability of the invention to broadcast television channels, the invention will be described in such environment.

Figure 1:
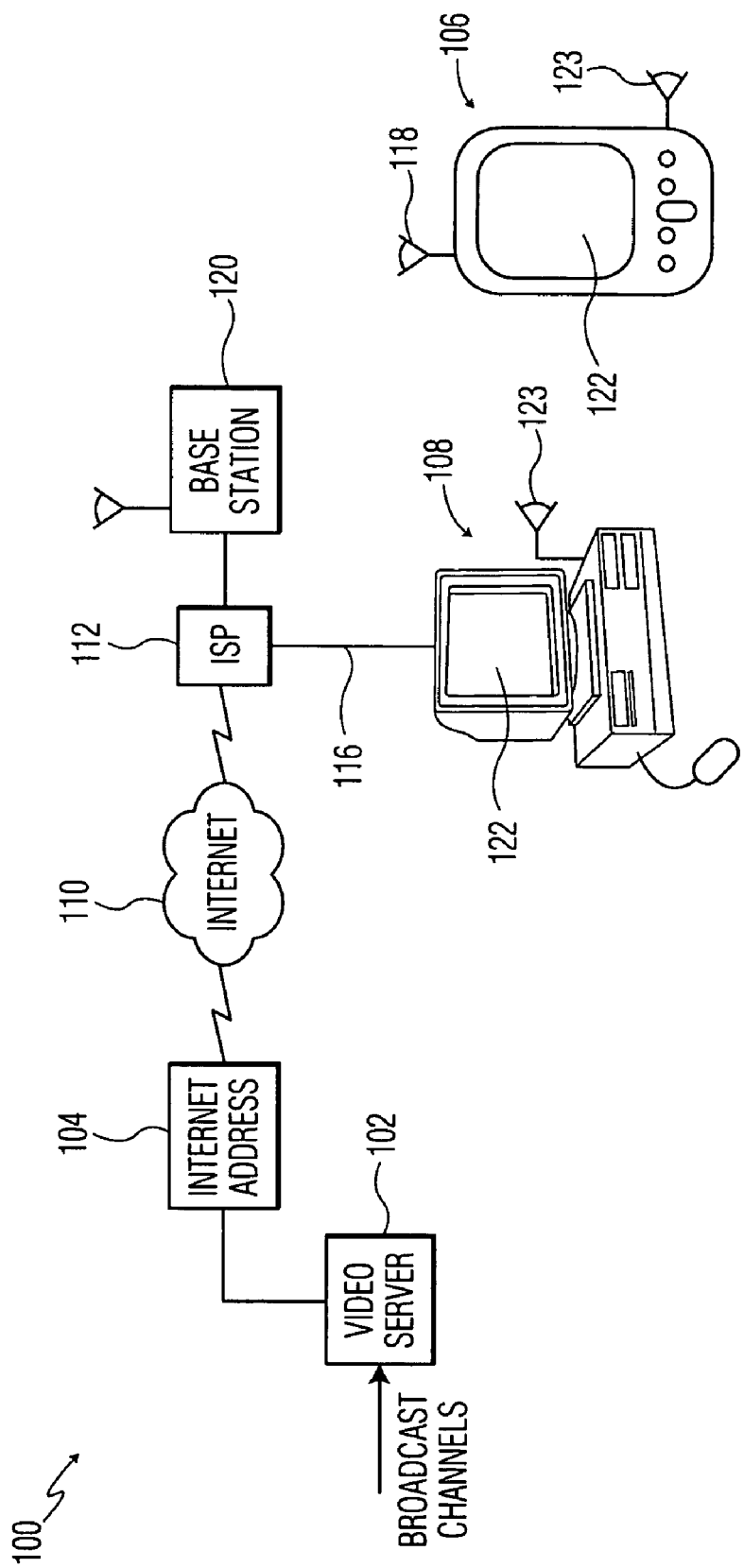
FIG. 1 illustrates a preferred implementation of the system for reviewing broadcast channels of the present invention.

Referring now to FIG. 1, there is shown a preferred implementation of a system for reviewing broadcast channels, the system generally being referred to by reference numeral 100. The system 100 comprises a capturing means for capturing at least one broadcast channel at a first site. Preferably a plurality of broadcast channels are captured, such as local television broadcast channels (ABC, CBS, NBC, FOX, etc.) and/or cable broadcast channels (HBO, DISNEY, ESPN, etc.). However, television broadcast channels are given by way of example only, and not to limit the scope or spirit of the present invention. For example, radio broadcast channels can also be captured or only the audio component of television broadcast channels.

Where the broadcast channels are television broadcast channels, the capturing means is preferably a video server 102. Thus, the television broadcast channels are input into the video server 102. Preferably, the video server supplies the broadcast channels to at least one Internet address 104. However, many internet addresses can also be used, each corresponding with a predetermined number of broadcast channels, or each with a single broadcast channel.

The broadcast channels are supplied to the Internet address at a reduced quality from their broadcast quality. For instance, where the broadcast channels are television broadcast channels, they can be captured at a reduced frame speed or a reduced resolution, or both. Reducing the quality of broadcast channels, such as by lowering their frame speed and/or their resolution, is well known in the art, such as by applying an appropriate filter to the video broadcast channel input.

A receiving means receives the reduced quality broadcast channels at a remote site from where the broadcast channels are captured. The receiving means is preferably a wireless communication device 106, such as a personal digital assistant (PDA) or a cellular telephone. However, other receiving means can be used without departing from the scope or spirit of the present invention, such as a personal computer 108 having access to the internet 108, through an Internet Service Provider (ISP) 110.

Figure 2A:
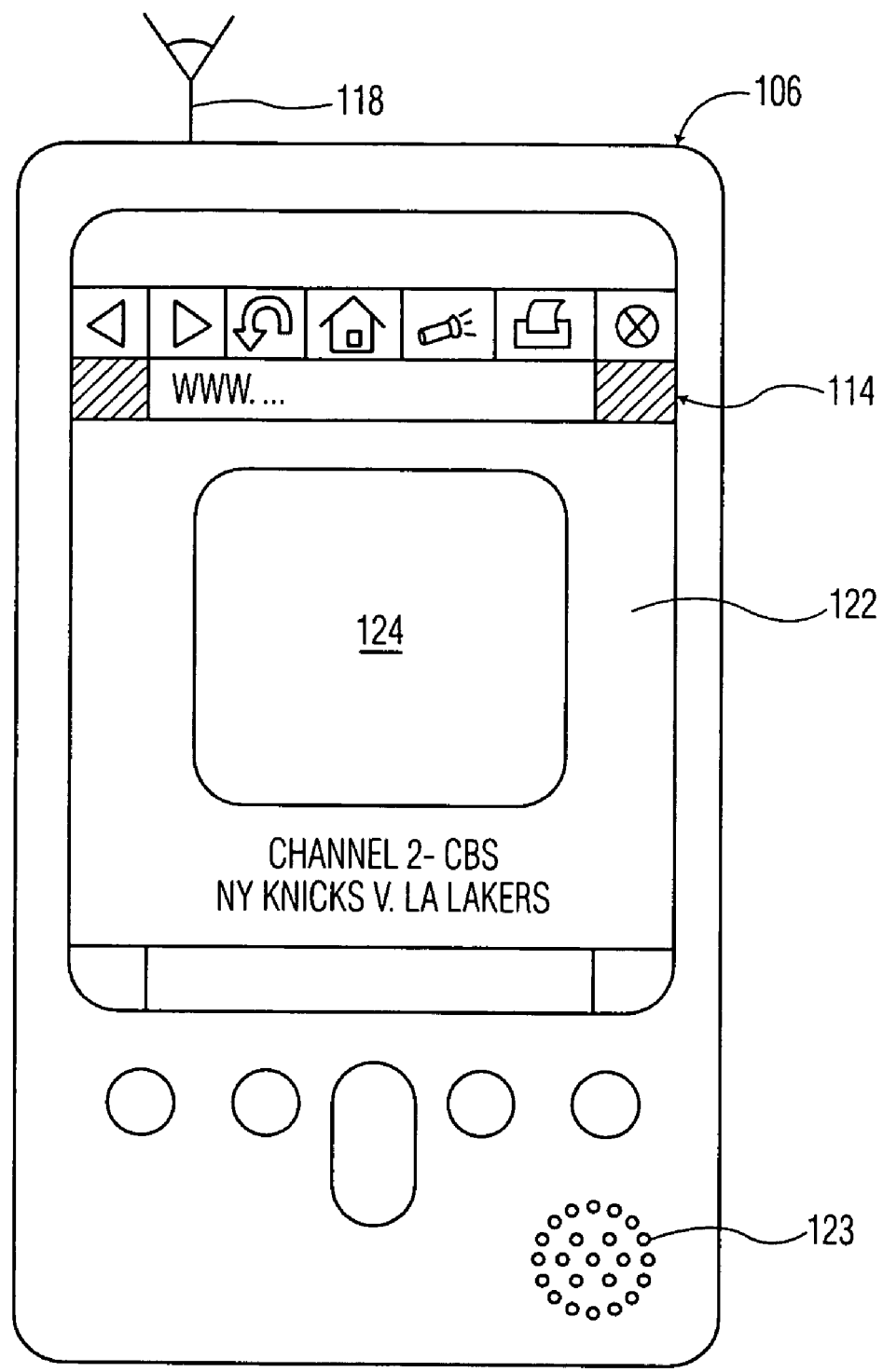
FIG. 2A illustrates a wireless communication device of FIG. 1 having one broadcast channel displayed thereon.
Figure 2B:
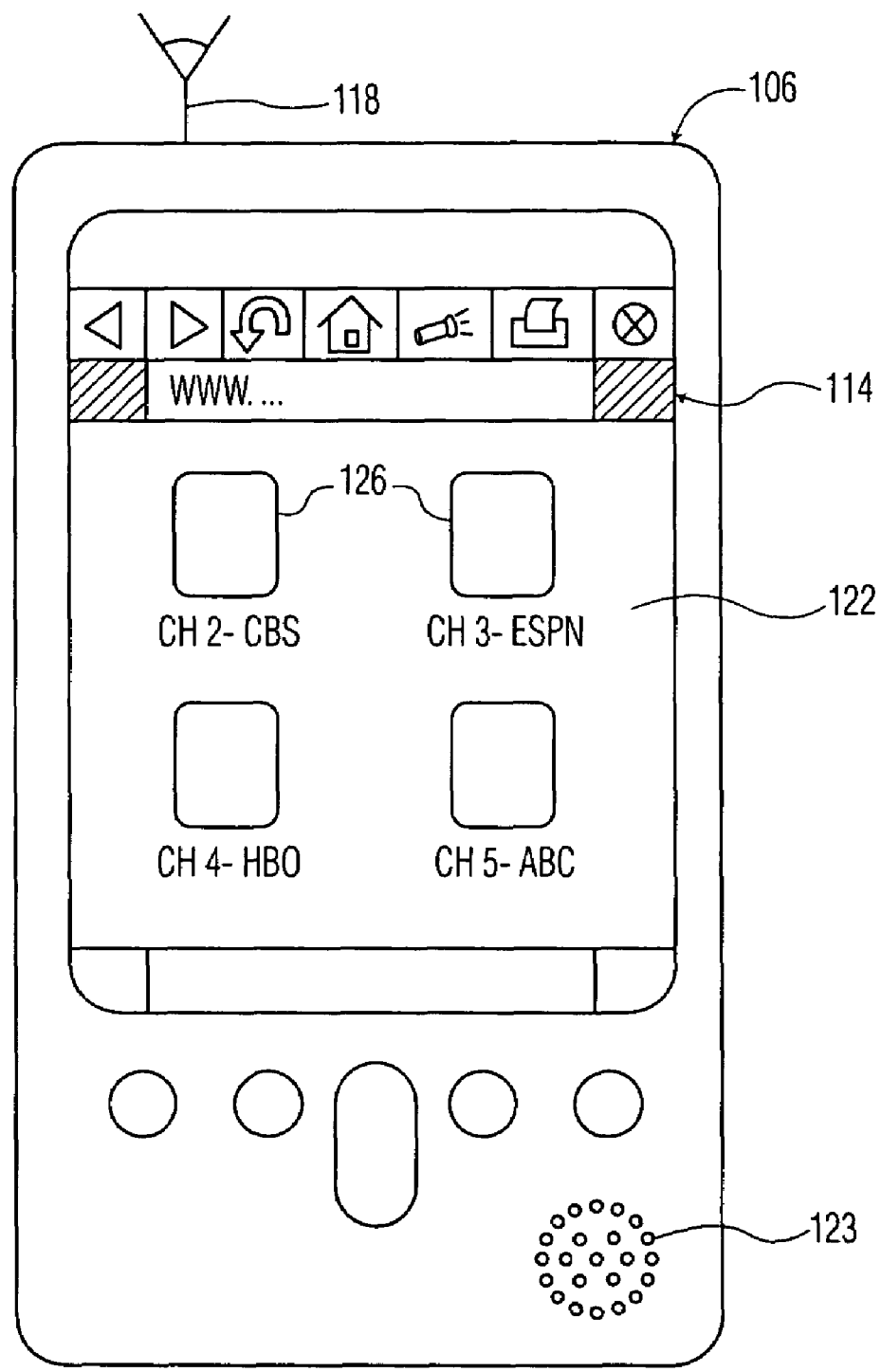
FIG. 2B illustrates a wireless communication device of FIG. 1 having multiple broadcast channels displayed thereon.

The receiving means preferably has means for accessing the Internet address 104 such as a web browser 114 (FIGS. 2A and 2B). Providing Internet access through a personal computer is well known in the art. Furthermore, providing Internet access through wireless devices such as a PDA or a cellular telephone is also well known in the art, such as those using the Wireless Application Protocol (WAP).

The receiving means also includes means for downloading the at least one reduced quality broadcast channel from the Internet address, such as a modem (not shown) which communicates through a fixed line such as a cable or telephony line 116 or through a wireless connection via an antenna 118 and base station 120. Modems for downloading data are well known in the art, and as such, are not discussed herein. Although there may be a technical difference between "downloading" where content is pulled by a second site and "streaming" where content is pushed by a first site, they are used synonymously herein, namely, as a transfer of data.

The receiving means preferably also has a reviewing means, such as a display 122, for reviewing the broadcast channel having the reduced quality and/or a speaker 123 for reproducing an audio broadcast channel and/or an audio component of a television broadcast channel. Where the receiving means is a personal computer, 108, the display 122 and speaker 123 comprise the computer's monitor and built-in speaker. Where the receiving means is a wireless communication device 106 such as a PDA or a cellular phone, the display 122 and speaker 123 are preferably an LCD and speaker integrated into the device which are not dedicated to the system 100 of the present invention.

The operation of the system 100 of the present invention will now be described with reference to FIGS. 1, 2A, and 2B. Assume there are 100 television broadcast channels that are available. Multiple video servers 102 capture these channels at some reasonable speeds and resolutions and in some standard formats, for instance using JPEG, MPEG1, or MPEG4 formats.

For a user to receive the streams of these channels at either the wireless communication device 106 or the personal computer 108, there are two preferred options. The first is by multicasting, where the video servers 102 multicast the captured broadcast channel streams on some well-known IP addresses 104. A receiving means, which has the proper multicast client, can "tune" into these addresses and receive the streams. The second option is by unicasting, where a dedicated connection is established between the video server 102 and the receiving means before the receiver means can receive the broadcast channel stream. Both options can be implemented with Internet video streaming technologies which are well known in the art.

Thus, the methods of the present invention provide a method for capturing the broadcast channels and preferably streaming them via Internet (broadband or narrow band) to an Internet capable device. For instance, if a user is standing in a check-out line of a supermarket, and wants to know the score of an NBA game and view portions of the game. With the system 100 of the present invention, he or she can use a wireless communication device 106 such as a cellular telephone or a PDA and dial up to a web site 104 having a reduced quality version of the NBA game broadcast. The wireless communication device first contacts its base station 120 for the particular cell that it is located in, which in turn contacts an ISP 112, which provides access to the Internet 110, and ultimately, to the Internet address 104 from which the NBA game broadcast is accessed. Where the receiving means is a personal computer 108, the same accesses the Internet 110 directly through the ISP 112 as is well known in the art.

Referring now to FIGS. 2A and 2B, there is shown the wireless communication device 106 of FIG. 1. From a web browser 114 the user can then choose the channel 124 broadcasting the NBA game and activate it. Instantly, the user is fed with the broadcast channel at a reasonable speed, for example, one frame/second. In viewing the reduced quality broadcast channel, it is important to keep the bandwidth requirement low in the case of wireless receiving means. Since one of the purposes of the viewing is supplementary to regular television viewing (e.g., to keep users updated on what is being broadcast on other channels), fewer but preferably "key" frames are sent to the receiving means. Identifying "key" frames in video content is well known in the art.

Those skilled in the art will recognize that with the system of the present invention, a user is not restricted by the number of turners on their television, but only by the data throughput between the video server 102 that streams the broadcast channels and the receiving means.

Once the Internet address 104 has been accessed via the web browser 114, the user can choose to view any of the broadcast channels available at the Internet address 104 with the browser 114. Furthermore, the broadcast channels that can be browsed is not limited to the location, as opposed to PIP which only captures the programs offered by a local service provider.

With the system 100 of the present invention one can view a single broadcast channel as is shown on the display 122 of FIG. 2A or the user can view multiple broadcast channels simultaneously as shown in FIG. 2B with multiple "thumbnails" 126 of slow changing channels on the receiver's display 122. As yet another alternative, the browser 114 can cycle through predetermined favorable broadcast channels, staying on each channel for a few seconds or waiting for a prompt from the user before cycling to the next channel.

Additional services such as supplementary information about a movie and a game can also be streamed along with the video streams of the broadcast channels. The supplemental information can then be displayed along with the reduced quality broadcast channel. Such information can be in the form of audio and or video content such as a spoken or written review of a movie currently being broadcast on a particular channel. Where the supplemental information is audio or has an audio component, the audio is preferably reproduced by a speaker 123 integral with the personal computer 108 or wireless communication device 106.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method of facilitating broadcast channel surfing, comprising:
   receiving a plurality of broadcast signals from a plurality of broadcast channels, the broadcast signals being configured to enable viewing of video information at a first quality level;
   processing the plurality of broadcast signals into a corresponding plurality of surfing signals that provide a second quality level that is poorer than the first quality level; and
   broadcasting the plurality of surfing signals substantially concurrent in time with the corresponding broadcast signals to enable channel surfing of the surfing signals at a remote device at a time of surfing that is not substantially different from a time of broadcasting the corresponding broadcast signals.

2. The method of claim 1, wherein
   broadcasting the surfing signals includes providing substantially continuous access to the plurality of surfing signals at a corresponding plurality of Internet addresses.

3. The method of claim 1, wherein
   the broadcasting of the plurality of surfing signals is configured to facilitate selective reception of each surf signal.

4. The method of claim 1, wherein
   the processing of the broadcast signals includes:
      identifying key frames in the broadcast signals, and
      forming the surfing signals from the key frames.

5. The method of claim 1, wherein
   the first and second quality levels are based on at least one of:
      an image resolution, and
      a frame rate.

6. A server that facilitates broadcast channel surfing, comprising:
   a receiving system that is configured to receive a plurality of broadcast signals from a plurality of broadcast channels, the broadcast signals being configured to enable viewing of video information at a first quality level;
   a processor that is configured to process the plurality of broadcast signals to form a corresponding plurality of surfing signals that provide a second quality level that is poorer than the first quality level; and
   a transmission system that is configured to broadcast the plurality of surfing signals substantially concurrent in time with the corresponding plurality of broadcast signals; to enable channel surfing of the surfing signals at a remote device at a time of surfing that is not substantially different from a time of broadcasting the corresponding plurality of broadcast signals.

7. The server of claim 1, wherein
   the transmission system includes an Internet web-server, and broadcasting the surfing signals includes providing substantially continuous access to the plurality of surfing signals at a corresponding plurality of Internet addresses.

8. The server of claim 1, wherein
   the transmission system is configured to broadcast the plurality of surfing signals so as to facilitate selective reception of each surf signal.

9. The server of claim 1, wherein
   the processor is configured to:
      identify key frames in the broadcast signals, and
      form the surfing signals based on the key frames.

10. A method of facilitating broadcast channel surfing, comprising:
    receiving current broadcast signals from at least one broadcast channel, the broadcast signals being configured to enable viewing of video information at a first quality level;
    encoding the broadcast signals into surfing signals to provide a second quality level that is poorer than the first quality level; and
    broadcasting the surfing signals substantially concurrent in time with the corresponding broadcast signals to enable viewing of the surfing signals at a remote device at a time of surfing that is not substantially different from a time of broadcasting the corresponding broadcast signals from the at least one broadcast channel.

11. The method of claim 10, wherein
    broadcasting the surfing signals includes providing substantially continuous access to the surfing signals at one or more Internet addresses.

12. The method of claim 11, wherein
    the broadcast signals correspond to a plurality of broadcast transmissions from a plurality of broadcast channels, and
    the surfing signals are accessed via a plurality of Internet addresses, each address of the plurality of Internet addresses corresponding to each broadcast channel of the plurality of broadcast channels.

13. The method of claim 10, wherein
    the surfing signals are configured to facilitate reception via a portable device.

14. The method of claim 10, wherein
    encoding the broadcast signals at the second quality level provides surfing signals that consume substantially less bandwidth than signals encoded at the first quality level.

15. The method of claim 10, wherein
the broadcast signals correspond to a plurality of broadcast transmissions from a plurality of broadcast channels, and
the surfing signals correspond to a plurality of surf signals, each surf signal of the plurality of surf signals corresponding to each broadcast transmission from the plurality of broadcast channels.

16. The method of claim 15, wherein
the broadcasting of the surfing signals is configured to facilitate selective reception of each surf signal.

17. The method of claim 10, wherein
the processing of the broadcast signals includes:
identifying key frames in the broadcast signals, and
forming the surfing signals from the key frames.

18. The method of claim 10, wherein
the first and second quality levels are based on at least one of:
an image resolution, and
a frame rate.

19. The method of claim 2, wherein
the broadcast signals correspond to a plurality of broadcast transmissions from a plurality of broadcast channels, and
the surfing signals are accessed via a plurality of Internet addresses, each address of the plurality of Internet addresses corresponding to each broadcast channel of the plurality of broadcast channels.

20. The method of claim 2, wherein
the broadcast signals correspond to a plurality of broadcast transmissions from a plurality of broadcast channels, and
the surfing signals are accessed via one or more Internet addresses.

21. The server of claim 6, wherein
the transmission system includes an Internet web-server, and broadcasting the surfing signals includes providing substantially continuous access to the surfing signals at one or more Internet addresses.

22. The server of claim 7, wherein
the broadcast signals correspond to a plurality of broadcast transmissions from a plurality of broadcast channels, and
the surfing signals are accessed via a plurality of Internet addresses, each address of the plurality of Internet addresses corresponding to each broadcast channel of the plurality of broadcast channels.

23. The server of claim 8, wherein
the broadcast signals correspond to a plurality of broadcast transmissions from a plurality of broadcast channels, and
the surfing signals are accessed via one or more Internet addresses.

* * * * *

UNITED STATES PATENT AND TRADEMARK OFFICE
CERTIFICATE OF CORRECTION

PATENT NO. : 7,386,870 B2  Page 1 of 1
APPLICATION NO. : 09/935885
DATED : June 10, 2008
INVENTOR(S) : Jin Lu It is certified that error appears in the above-identified patent and that said Letters Patent is hereby corrected as shown below:

Col. 6, Line 19, change "claim 1" to --claim 6--;
Col. 6, Line 25, change "claim 1" to --claim 6--;
Col. 6, Line 29, change "claim 1" to --claim 6--;
Col. 8, Line 21, change "claim 8" to --claim 7--.

Signed and Sealed this

Twenty-first Day of April, 2009

JOHN DOLL
*Acting Director of the United States Patent and Trademark Office*